United States Patent [19]

Dzus

[11] 3,916,550
[45] Nov. 4, 1975

[54] ANIMAL MARKER
[75] Inventor: Theodore Dzus, West Islip, N.Y.
[73] Assignee: Dzus Fastener Co., Inc., West Islip, N.Y.
[22] Filed: May 30, 1974
[21] Appl. No.: 474,666

[52] U.S. Cl. ................................................ 40/300
[51] Int. Cl.² ........................................ G09F 3/00
[58] Field of Search ............ 40/21, 21 C, 10 C, 329, 40/300, 304, 2, 20

[56] References Cited
UNITED STATES PATENTS

| | | | |
|---|---|---|---|
| 799,997 | 9/1905 | McLellan | 40/329 X |
| 869,686 | 10/1907 | Bauno | 46/1 R |
| 3,585,743 | 6/1971 | Jeffers | 40/21 C |
| 3,805,427 | 4/1974 | Epstein | 40/21 C |

*Primary Examiner*—Robert W. Michell
*Assistant Examiner*—Wenceslao J. Contreras
*Attorney, Agent, or Firm*—Kane, Dalsimer, Kane, Sullivan and Kurucz

[57] ABSTRACT

An expandable animal identification marker formed of an integral deformable resilient lattice of plastic material in the shape of a tube. The tubular lattice is of a predetermined diameter when in the relaxed condition and is responsive to pressure to deform into a tubular configuration of increasing inner diameter while tending to return to the relaxed position. Therefore, when the tube is slightly expanded and placed on a portion of an animal it will remain in place thereon with the assistance of the lattice tending to return to the relaxed condition. As the animal grows, the lattice will automatically deform and expand accordingly. The plastic of the lattice is of the type where a predetermined minimum amount of pressure is exerted when it attempts to return to the relaxed condition thereby avoiding deleterious affects on the animal while retaining the lattice in position. Finally, the tubular lattice is adapted to receive an identification marking thereon to designate a specific animal.

3 Claims, 6 Drawing Figures

ANIMAL MARKER

BACKGROUND OF THE INVENTION

Identification of animals such as livestock has been necessary throughout history. The most common types of identification which are presently in use include ear tags which are stapled through the ear of the animal with an identification imprinted thereon. The ear tags are generally of a metal material to facilitate their insertion through the animals's ears and to provide longevity for the tags. The tags remain on the animal throughout the animal's life.

Another common means of identification is the use of permanent brands where identification indicia is burned into the hide of the animal. Once again, the identification is permanent and is present for the life of the animal.

In either of the above two commonly used methods of identification, injury occurs to the animal which is naturally undesirable and in fact infection could occur particularly where a portion of the animal's body is pierced.

Branding has its disadvantages in that it is difficult to place long identification numbers on an animal particularly where a separate branding iron is required for each succeeding number. Ear tags permit the use of a separate tag for each succeeding number and render it easy to provide a long series of numbers in a relatively small space. However, in many environments, it is difficult to read a specific number particularly if you have to record the number periodically for a specific purpose. This is true in the milk industry where cows are kept in narrow adjacent stalls and it is often necessary to keep records on the milk produced by each individual animal. It is extremely difficult to read the small ear tag on each animal as one proceeds down the line.

Other attempts have been made to solve the problems of identification particularly in areas such as the dairy environment. Attempts have been made to attach tags or bands to the tail of an animal with a number appearing thereon. The difficulty with the presently available bands is that they are not sufficiently flexible to permit growth of the animal and to also allow for tail contraction when the weather drops below freezing. Present tail markers are of the type which have to be adjusted by the observer periodically for changes in cow size and weather conditions. There is no marker presently available which automatically allows for expansion and contraction while having the ability to retain itself on the tail during normal use.

It should also be kept in mind that health considerations bear upon the acceptability of markers. The marker must be one which allows for expansion and contraction and still is prevented from sliding down the tail as the animal proceeds through normal activity. If the engaging force is too confining and sealed from ready access so that it is difficult to clean, it can become a breeding ground for bacteria and infection. The marker should have a surface area that is not roughened or closely confined so that cleaning is difficult and disease and infection can occur.

Naturally, disposability is desirable as well as low cost. It can be readily seen that a large number of tags are needed and, accordingly, should be producible at low cost.

Other ideal criteria of the marker particularly if it is to be used for the tail of an animal is that it should be non-porous, moisture-proof, and have no open pockets which would absorb and retain moisture, sweet or dirt. Any such pockets or pores would provide breeding places for bacteria and promote infection. The marker must be flexible to allow for an uneven curvature of the tail to permit the tail to develop during the growth of the animal and to prevent the restriction of blood circulation. The device should provide for positive fastening at all times to prevent loss of the tag caused by tail swishing, abrasive action due to rubbing against bushes and the like. The material should not rust, corrode or deteriorate in all manner of weather conditions or due to constant exposure to sweat. There should not be any sharp edges or protrusions which would cut or abrade the skin of the tail.

Furthermore, it is desirable to have a tag assembly which allows for semi-permanent attaching and sometimes detachment of an identification number to the tail of a livestock animal, allow for flexibility and expansion so as to permit the tag to fit snugly on the tail without cutting off the blood circulation, and allow for marking the tag material with an indelible number.

SUMMARY OF THE INVENTION

With the above criteria and background in mind, it is of among the primary objectives of the present invention to provide an animal marker which satisfies all of the above desirabilities and, in general, is designed of low cost material, is easy to apply to the animal, minimizes the danger of infection, and is automatically expandable and contractable when positioned on the animal to account for animal growth and weather conditions. Furthermore, the marker is sufficiently self-supporting on the animal so that it will not be displaced during normal activity.

In summary, an expandable animal identification marker is provided in the form of an integral deformable resilient lattice of plastic material in the shape of a tube. The tubular lattice is of a predetermined diameter when in the relaxed condition and is responsive to pressure to deform into a tubular configuration of increasing inner diameter while tending to return to the relaxed position. Therefore, when the tube is slightly expanded and placed on a portion of an animal, it will remain in place thereon with the assistance of the lattice tending to return to the relaxed condition. As the animal grows, the lattice will automatically deform and expand accordingly. The plastic of the lattice is of the type where a predetermined minimum amount of pressure is exerted when it attempts to return to the relaxed condition thereby avoiding deleterious affects on the animal while retaining the lattice in position on the animal. Finally, the tubular lattice is adapted to receive an identification marking thereon to designate a specific animal.

Naturally with the lattice always tending to return to the relaxed condition, when the portion of the animal to which it is attached such as the tail contracts due to weather conditions, the tubular lattice will contract and retain its fixed position on the animal.

With the above objectives in mind, attention is directed to the attached drawings.

DESCRIPTION OF THE PREFERRED EMBODIMENT

Figure 1:
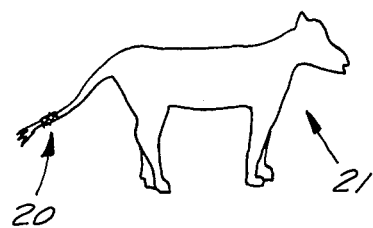
FIG. 1 is a perspective view of the marker of the invention shown attached to the tail of a calf.

Animal marker 20 is adaptable for mounting on a portion of an animal for identification purposes. It is particularly adaptable for placement on the tail of an animal 21 as shown in the drawing. The marker is in the form of a tubular lattice which is flexible and resilient and is expandable. Material for the lattice 22 can be of any conventional well known material such as plastics like polyethylene polypropylene or polyurethane. The lattice is formed of two layers of strips. The outer surface layer is formed of parallel strips 23 and the inner surface layer is formed of parallel strips 24. Strips 23 and 24 are extended at an angle to one another and each strip 23 is integrally attached to the plurality of strips 24 at spaced intervals. In a similar manner each strip 24 is integrally formed in attachment with a plurality of strips 23 at spaced intervals. A convenient method of forming lattice 22 is by an extrusion process whereby the strips 23 and 24 are extruded simultaneously upon one another from separate nozzles so that engagement of the heated extruded plastic strips causes the strips to integrally bond at the points where they engage.

Alternatively, it can be envisioned how strips 23 and 24 can be attached at their meeting points by a bonding agent or other conventional means.

Mounted on lattice 22 is an identification tag 25 with an indelible numerical designation thereon to correspond to the particular animal. Tag 24 is of a permanent type material and has four small openings 26 therethrough adjacent its four corners. A snap-in fastener element 27 is provided for each of the four openings. Each snap-in element has an enlarged head and a smaller body portion terminating in a locking tip. The head is larger than the spaces between the strips of tubular lattice 27. Therefore, the snap-in fasteners can be passed through the lattice with the head in engagement with the lattice strips and then passed through the openings 26 and the tag to snap into position locking the tag to the tubular lattice. The marker 20 is then in condition for attachment to an animal for identification purposes. It can naturally be envisioned how the marker could be fastened by some other conventional means to the tubular lattice in a semi-permanent or permanent fashion. In fact, the numbers on the tag could be indelibly place directly on the lattice strips in a manner which would permit them to be read. In that form, no additional tag would be required for the marker.

Figure 2:
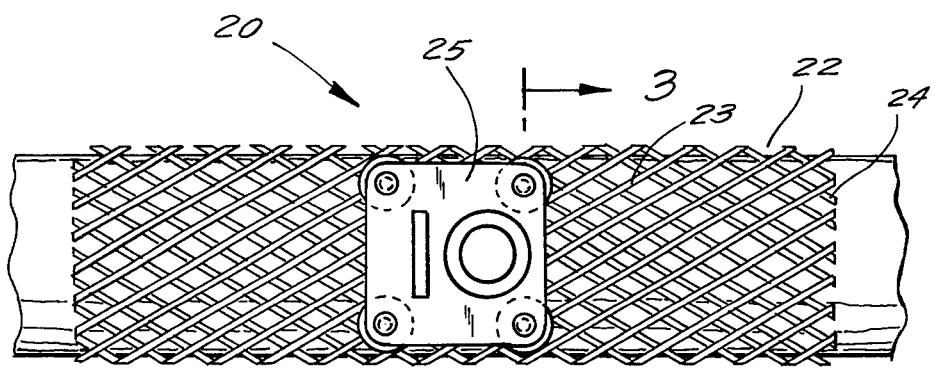
FIG. 2 is a fragmentary plan view thereof.
Figure 3:
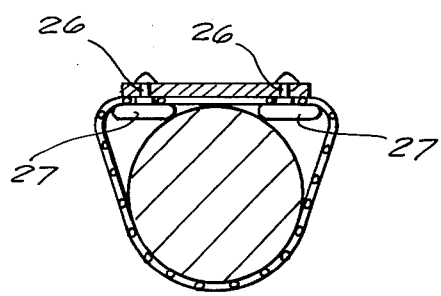
FIG. 3 is a sectional end view thereof taken along the plane of line 3—3 of FIG. 2.

In use, marker 20 is applied to the animal when it is at a young age such as a newly born calf as depicted in FIGS. 1–3. To attach the marker, the lattice 22 is slightly expanded by pressure from within so that it deforms slightly which results in an expanded inner diameter. The slightly expanded lattice 22 is then slipped over the tail of the calf 21 and released. The resilient lattice 22 made up of the deformed strips will tend to return to its initial relaxed configuration and thereby grip the tail sufficiently to hold the marker in place during normal handle activity. The nature of the lattice material is such that the force applied by the marker in its attempt to return to the relaxed configuration with a smaller inner diameter is not of sufficient magnitude to injure the animal or cause him discomfort or endanger blood circulation.

Figure 4:
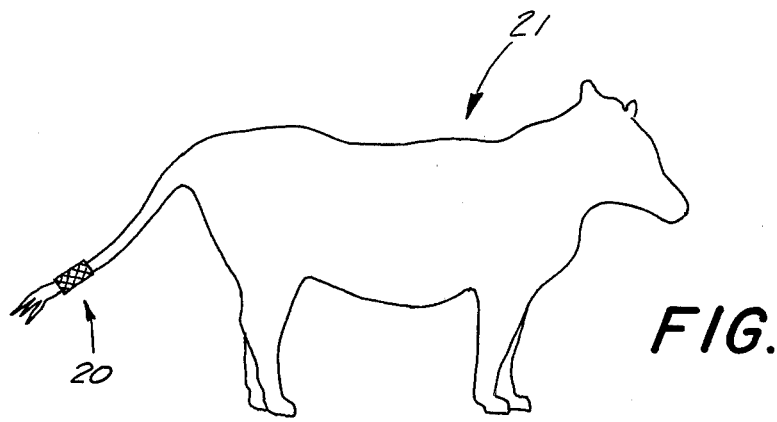
FIG. 4 is a perspective view thereof showing the condition of the marker when the calf is a full grown cow.
Figure 5:
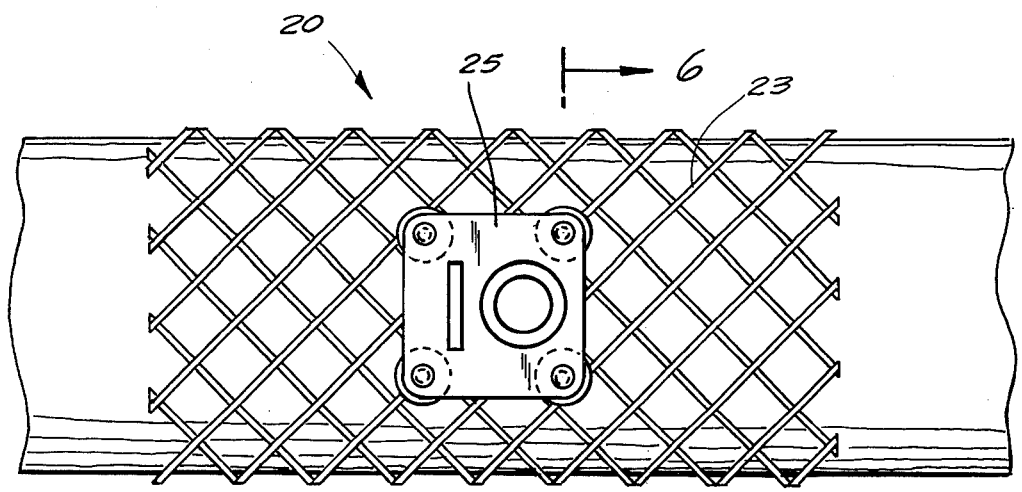
FIG. 5 is a fragmentary plan view of the marker on the cow as depicted in FIG. 4.
Figure 6:
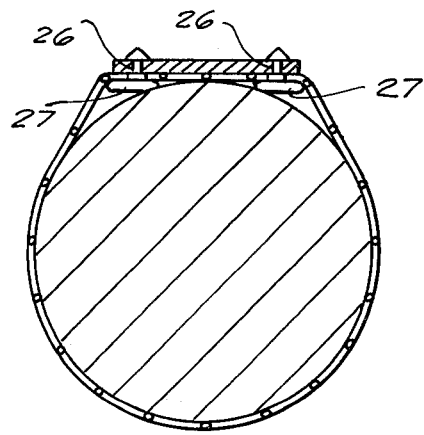
FIG. 6 is a sectional end view thereof taken along the plane of line 6—6 of FIG. 5.

As the animal grows to full size as shown in FIGS. 4–6, the lattice will continue to expand with the strips deforming so that the relative angle between the layers of strips is changed. It will be noted how the angle at each integral point of interengagement in the longitudinal direction changes from an accute angle to a wider angle such as substantially a right angle as shown in FIG. 5. The expansion occurs automatically without any deleterious affect on the animal or any danger occurring of the marker slipping off the animal's tail. The pressure of the lattice 22 on the animal's tail does not materially change thereby achieving the advantageous results discussed above. Lattice 22 continues to attempt to return to its relaxed condition and therefore remains in fixed position on the animal's tail.

It should also be noted that expansion and contraction of the lattice diameter can also occur repeatedly. Therefore, as weather conditions change such as below and above freezing temperature, the lattice 22 of marker 20 will automatically expand and contract as the animal's tail expands and contracts. No material change occurs in the engaging relationship between the marker and the tail under the changing weather conditions and, accordingly, the same advantageous features as discussed above are retained.

Naturally, should it be desirable at any time to remove marker 20 from the animal's tail, it can be easily done by simply slightly expanding marker 20 and sliding it off the end of the tail of the animal. This is easily accomplished whether the marker is in the smaller diameter condition as shown in FIGS. 1–3 or in the larger diameter condition as shown in FIGS. 4–6.

Lattice or network 22 is of a low cost material such as an extruded plastic tube and, therefore, is designed for disposability and one-time use. Alternatively, since no material change in structure occurs in placing and removal of the marker from the animal, it can be reused on another animal where it will operate once again in the manner described above.

Thus, the above discussed objectives, among others, are effectively attained.

What is claimed is:

1. An expandable animal identification marker comprising; an integral deformable resilient tubular lattice of flexible plastic material in the shape of a tube, the tubular lattice being of a predetermined diameter when in the relaxed condition and being responsive to pressure to deform into a tubular configuration of increasing inner diameter while tending to return to the relaxed position so that when the tube is slightly enlarged and placed on a portion of an animal it will remain in position thereon with the assistance of the lattice tending to return to the relaxed condition gripping the surface to which it is applied and as the animal grows the lattice will automatically deform and expand accordingly, the plastic of the lattice being of the type where a predetermined minimum amount of pressure is exerted when it attempts to return to its relaxed condition thereby avoiding deleterious effects on the animal while retaining the lattice in position on the animal, the tubular lattice having an identification marking mounted thereon to designate a specific animal, the tubular lattice being formed of two layers of strips of flexible plastic with each layer having its strips extending substantially parallel to one another and extending at an angle to the strips of the other layer, the strips of one layer being integrally connected to strips of the other layer at each point of intersection to prevent displacement of one strip with respect to another beyond the natural deformation ability of the plastic material so that when pressure is applied from within the tube against the plastic, the strips will deform and the inner diameter of the tubular lattice will increase and when the pressure is released the tubular lattice will tend to return to the relaxed configuration with the smaller inner diameter.

2. The invention in accordance with claim 1 wherein the plastic for the tubular lattice is polyethylene material and the marker is of a configuration for application to an animal's tail.

3. The invention in accordance with claim 1 wherein the identification marking is in the form of a tag having a numerical designation thereon and being attached to the lattice by means of snap-on rivets passed through the lattice and through receiving openings in the tag to thereby affix the tag to the lattice.

* * * * *